United States Patent

[11] 3,552,619

[72] Inventor Raymond A. Skiba
Detroit, Mich.
[21] Appl. No. 789,126
[22] Filed Jan. 6, 1969
[45] Patented Jan. 5, 1971
[73] Assignee Burroughs Corporation
Detroit, Mich.
a corporation of Michigan

[54] LINE SPACING SELECTOR WITH SLIDABLE TAPE READER
5 Claims, 3 Drawing Figs.

[52] U.S. Cl. .................................................. 226/76, 197/133, 197/20
[51] Int. Cl. .................................................. G03b 1/24
[50] Field of Search .......................................... 226/9, 110, 76

[56] References Cited

UNITED STATES PATENTS 2,842,248 7/1958 Saltz et al. .................... 226/9(X)

*Primary Examiner*—Allen N. Knowles
*Assistant Examiner*—Gene A. Church
*Attorney*—Charles S. Hall

ABSTRACT: Apparatus for selecting the spacing or density of operations (number of operations per unit length of material) in a machine for advancing material and performing operations thereon according to format information carried on an endless tape. The format tape is selectively movable between two positions on coaxially aligned drive means; the tape is driven at a different speed in each position, each speed resulting in a different spacing of operations. A tape reader is slidable to each of the tape positions.

PATENTED JAN 5 1971 3,552,619

SHEET 1 OF 3

INVENTOR.
RAYMOND A. SKIBA
BY Jerold I. Schneider
AGENT

INVENTOR.
RAYMOND A. SKIBA
BY Jerold I. Schneider
AGENT

INVENTOR.
RAYMOND A. SKIBA
BY Jerold I. Schneider
AGENT

LINE SPACING SELECTOR WITH SLIDABLE TAPE READER

BACKGROUND OF THE INVENTION

Many modern machines are controlled by a format tape such that as material is advanced through a work station, operations performed on the material and the advance of the material itself are controlled by information on the format tape. The particular operations on the material may take several forms, for example, cutting, stamping, bending or printing. My invention has utility in machines of this type, particularly with respect to a high-speed printer used as the output of a data processing machine wherein the line spacing or line density, that is, the number of printed lines per inch of material, as well as the printing format is controlled by the information on the format tape.

In many computer operations it is desirable to print the output on a prepared form. There are two industry-wide standard printing densities presently in use, 6 lines per inch (low) and 8 lines per inch (high). In these machines the material and the format tape are normally driven in synchronism. Changing the speed of the material being advanced would not change the printing density because of the synchronous format tape advance. Of course a different format tape could be used for different line densities but this creates a storage problem since duplication of each format tape for each density is necessary. To reduce this storage requirement and provide greater machine flexibility it is desirable to have a single format tape which may be driven at a low speed or a high speed corresponding to the 6 lines per inch or 8 lines per inch spacing, respectively.

The prior art devices, such as U.S. Pat. No. 2,842,248, Saltz et al., provide a complex gearing arrangement wherein the operator manually shifts a control lever causing the gearing system to change the format drive from low speed to high speed. This drive adds inertia to the format tape drive causing increased wear and tear to the tape drive. To reduce the inertia and wear a different approach to this problem is necessary.

SUMMARY

It is accordingly an object of the present invention to provide, in a machine for advancing material and performing operations thereon according to information carried on an endless format tape, a new and improved apparatus for selecting the spacing or density of the operations.

Another object of the invention is to provide an improved apparatus for selecting line spacing in a high-speed printer which obviates the need for elaborate gearing.

These and other objects are accomplished by providing a format tape drive apparatus having two drive positions; each position for driving the tape at a different speed in synchronism with the material advance. The apparatus includes two drive sprockets, two takeup reels and a slidable format reader which can be moved to either drive position. Means are also provided to vary the distance between each drive sprocket and its takeup reel to facilitate installation and adjustment of the format tape.

The foregoing objects and features of novelty which characterize my invention, as well as the other objects of the invention, are pointed out with particularity in the claims which form a part of the present specification. For a better understanding of the invention, its features and the specific objects and advantages attained with its use, reference should be had to the accompanying drawings and descriptive matter.

BRIEF DESCRIPTION OF THE DRAWINGS

In the drawings, wherein like reference characters indicate corresponding parts.

DESCRIPTION OF THE PREFERRED EMBODIMENT

Figure 1:
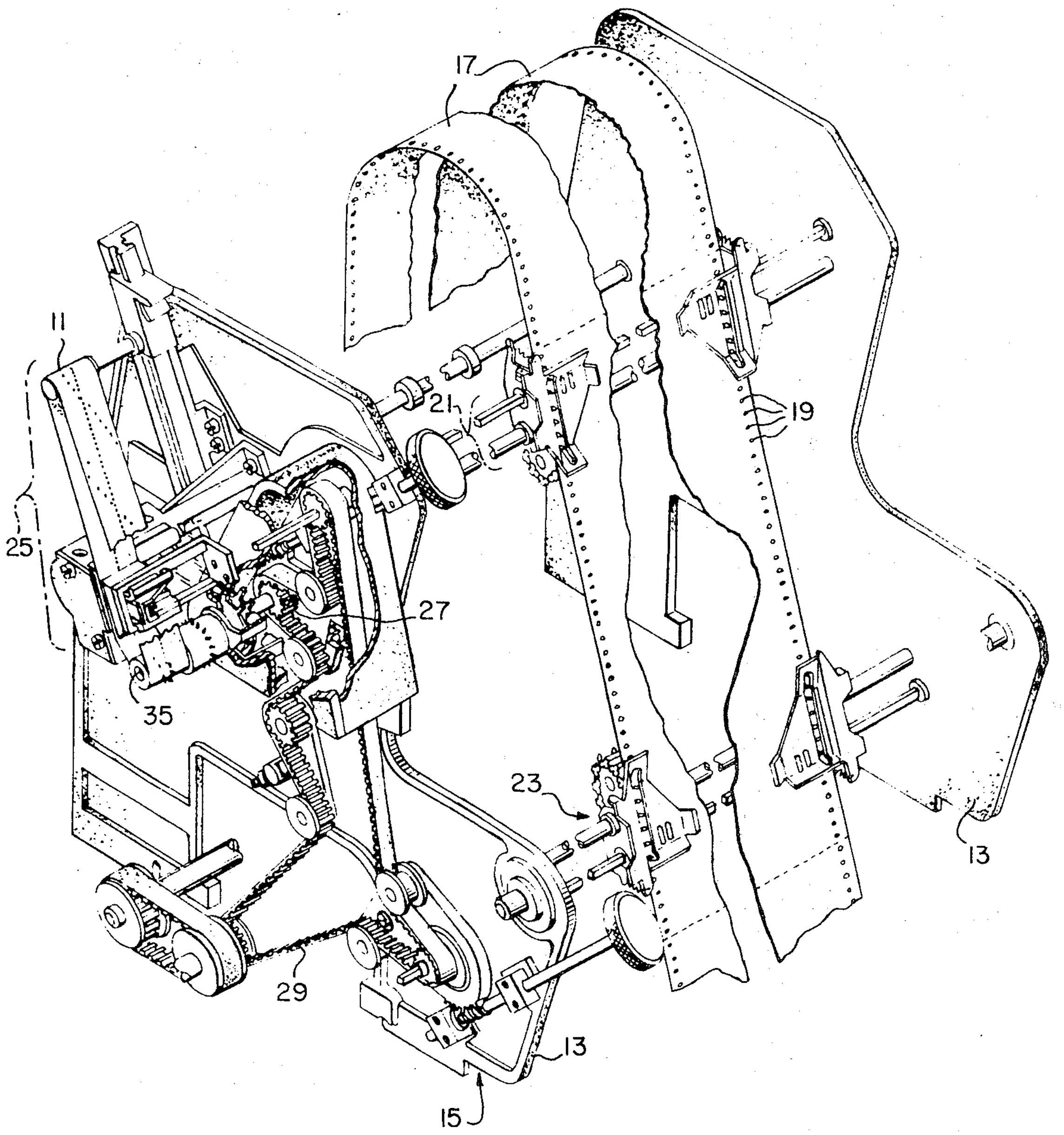
FIG. 1 is an overall perspective view of the high-speed printer.

FIG. 1 shows generally the elements of a paper drive apparatus for a high-speed printer associated with an electronic data processing machine. With respect to printer 15, paper 17 is advanced through the printing station by upper and lower pairs of paper drive tractor assemblies 21, 23 which have pins to engage perforations 19 in the paper. These drive tractor assemblies also include shafts which are advanced by the toothed belt 29. Format tape 11 is advanced in synchronism with the advance of the paper 17 since belt 29, which advances the paper through the drive tractor assemblies, also drives pulley 27, which rotates shaft 35, which, in turn, advances the format tape drive apparatus. The operation of the belt drive and synchronous advance is more fully described in the copending application of Skiba, Ser. No. 789,341, filed Jan. 6, 1969, entitled "Paper Tension and Registration Apparatus." Shown generally at 25 is the format tape drive apparatus which comprises the invention to which this application is directed.

Figure 2:
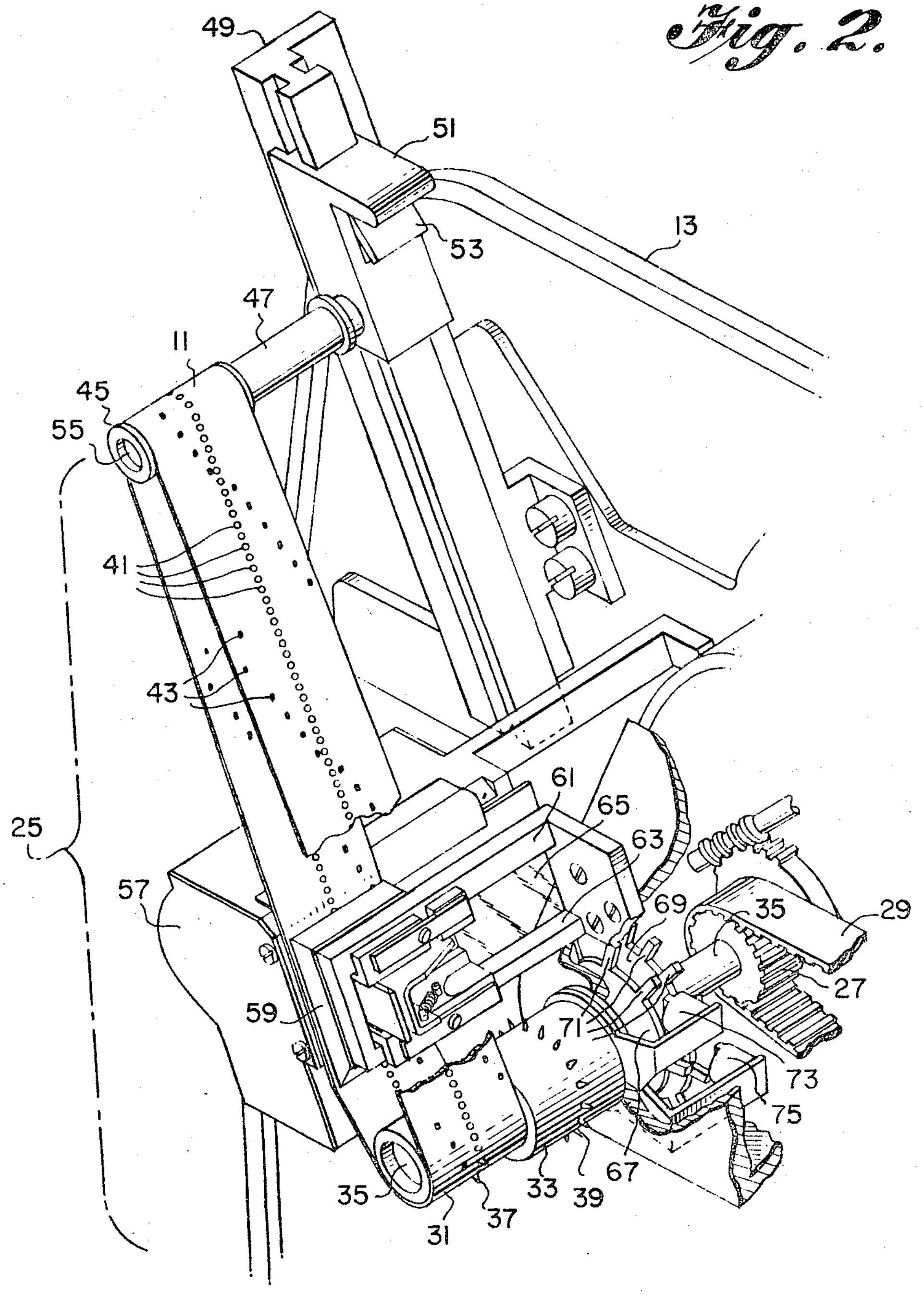
FIG. 2 is a perspective view of the format tape reader assembly.

Referring now to FIG. 2, which is a perspective view of the format tape drive apparatus attached to the high-speed printer, drive belt 29, which advances the paper, drives pulley 27 as previously indicated. One end of shaft 35 is journaled in pulley 27 and rotates therewith to advance format tape 11 in synchronism with the advance of the paper 17. The format tape is advanced by drive sprockets 31 and 33 which are mounted on the other end of shaft 35. Format information carried on tape 11 is read by tape reader 59 which converts the information into electrical pulses in a well-known manner. These pulses control a source of motive power (not shown) for signaling the electromagnetic clutches and brake (not shown) to control the drive mechanism so that the paper 17 will be positioned properly when a line of printing is to occur. This operation is more fully described in the copending application of Funk et al., Ser. No. 784,685, filed Dec. 18, 1968, entitled "Dual Speed Paper Advance System with Skip to Format Heading", assigned to the assignee of the present application.

In order to provide different line spacing it is necessary to vary the linear speed of the format tape relative to the linear speed of the paper. This may be accomplished, as previously pointed out, but utilizing a different length format tape having a different spacing between perforations 43 or by using a single format tape and an elaborate gearing mechanism. However, according to the principles of my invention, a single format tape may be used without the need for the gearing mechanism used in the prior art. Sprockets 31 and 33 have different diameters and are mounted side by side on shaft 35. Since sprocket 31 has a smaller diameter than sprocket 33 then for a constant angular speed the linear speed of the surface of sprocket 31 is lower than that of sprocket 33. Hence, the linear speed of format tape 11 is lower when it is on sprocket 31. To obtain the desired line spacing format tape 11 is installed on the appropriate sprocket 31 or 33. If the format tape is driven by the smaller sprocket 31 it will result in the lower printing density of 6 lines per inch, and if the format tape is driven by larger sprocket 33 printing will occur at the higher density of 8 lines per inch.

Because the format tape 11 is operable in either of two positions, i.e., it may be advanced by either sprocket, provision must be made for reading the format tape in each of these two positions. Instead of providing a separate reader for each position of the tape, the present invention provides a pair of guide channels 61 and 63 (extending parallel to shaft 35) upon which a single tape reader 59 is slidably mounted. The tape reader may be a photoelectric device of well-known design which emits electrical pulses as a result of sensing holes in the format tape (such as perforations 43) as they pass in front of the reader. A light source enclosed in the housing 57 is located on the side of the tape opposite to the reader 59 and shines light through a glass face plate 65 which, as seen in FIG. 2, extends across the two positions of the format tape. When a perforation 43 in the tape passes between the light source and the tape reader, the reader will emit an electrical pulse to control the operation of paper advance printing mechanism. This operation, which is well known in the art, does not form a part of the present invention.

As sprockets 31 and 33 rotate, the format tape 11 is driven by pins 37 or 39 on sprockets 31 and 33, respectively. The pins engage a column of sprocket holes 41 in the tape 11. Since the sprockets 31 and 33 have different diameters, the tape support at the opposite end of the tape must be adjustable to compensate for this difference. The tape support illustrated as shaft 55 has one end journaled in two rollers 45, 47, in vertical alignment with drive sprockets 31, 33, respectively. To compensate for the difference in the diameter of the two sprockets, shaft 55 is mounted for adjustment towards and away from the sprockets. The other end of shaft 55 is mounted in a guide block 51 which is slidably adjustable on a guide rail 49 attached to the machine frame 13. Block 51 is frictionally held in place against the guide rail 49 and the frictional connection may be released for adjusting the position of the block. To disengage the frictional connection an operator control lever 53 is provided on the block 51. By depressing lever 53, block 51 may be slid along guide rail 49 to adjust the tension on tape 11. This type of adjustment is also useful in accommodating format tapes of different lengths which may represent different printing formats.

As the paper is being advanced, it is necessary to signal when each line is ready for printing. For this purpose shaft 35 also has mounted thereon a 6 line per inch pulse disc 67 and an 8 line per inch pulse disc 69. Each of these discs has a series of teeth 71, made of a magnetic material, which have a generally square cross section. Magnetic pickup heads 73 and 75 respond to the change in the reluctance of the rotating pulse discs 67 and 69, respectively, as the teeth move past the heads. Therefore, if 6 line per inch spacing is desired, the format tape will be placed on sprocket 31, and as the 6 line per inch disc 67 rotates with the shaft 35, the reluctance pulses will be picked up at 73 imparting proper signals for each line of print to the printer 15. Similarly, if 8 line per inch spacing is desired, the format tape would be placed on sprocket 33, tape reader 59 would be moved to the corresponding position, and the pickup 75 will respond to the reluctance pulses of rotating disc 69 as each of its teeth 71 pass the pickup head.

Figure 3:
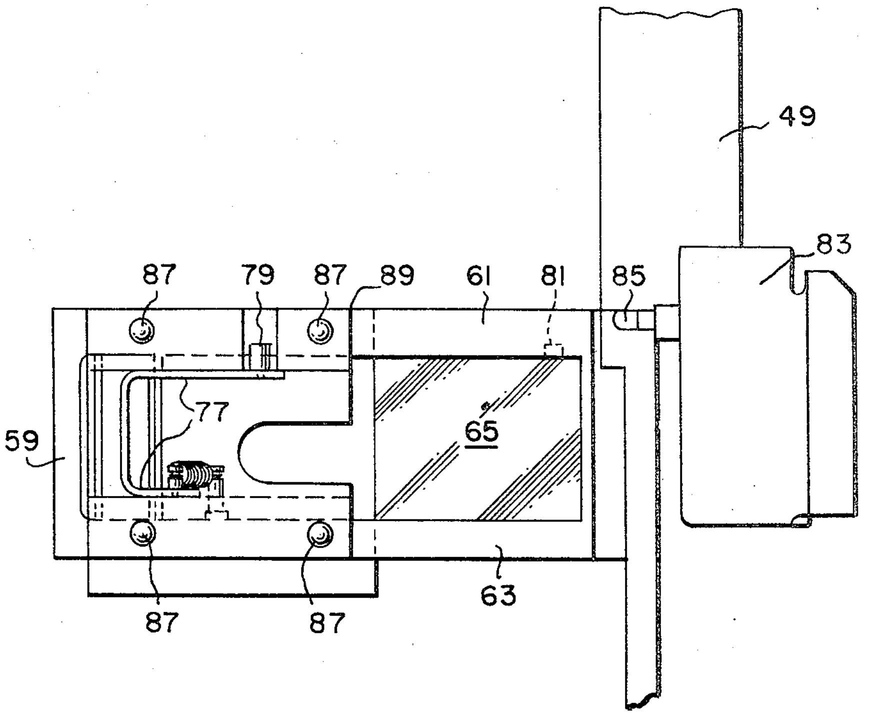
FIG. 3 is a front view of the format tape reader.

Referring now to FIGS. 2 and 3 the operation of changing the line spacing will now be explained. The format tape 11 is in the left-hand position as seen in FIG. 2 and the format tape reader 59 is in the left-hand position as seen in FIGS. 2 and 3. This provides 6 line per inch spacing. As shaft 35 is rotated by the advance of drive belt 29, pins 37 of sprocket 31 advance the format tape by engaging the holes 41, and the reader 59 senses the perforations 43 as previously described. Switch 83 is in the normally open position, which permits the pickup head 73 to receive signals from pulse disc 67, but prevents pickup 75 from transmitting signals from pulse disc 69. When it is desired to change to 8 lines per inch spacing, the machine must first be stopped. The operator then depresses lever 53 and slides the guide block 51 downward along guide rail 49 towards the sprockets and tape reader. This reduces the tension on format tape 11. Format tape 11 is then slid to the right-hand position such that the upper end of the tape fits over roller 47 and the lower end of the tape fits over sprocket 33 with the pins 39 engaging the sprocket holes 41. Again lever 53 is depressed and the guide block 51 is moved up guide rail 49 until appropriate tension is achieved in the format tape. At this time it is necessary to move the format tape reader into the right-hand position to permit sensing the perforations 43 in the format tape. This is accomplished by first squeezing the upper protrusion 77 on the format tape reader down towards the lower protrusion 77. This removes the detent 79 from the locking engagement hole in the guide rail 61. Once this has been done, the format tape reader is slid to the extreme right position. This sliding is facilitated by four bearings 87, two on the upper channel 61 and two on the lower channel 63. When the reader is in the appropriate position, the locking detent 79 engages a hole 81 to hold the tape reader securely in place. As this motion is completed the leading edge 89 of the format tape reader depresses the actuating lever 85 of switch 83, moving switch 83 into its closed position. Switch 83, in its closed position, permits only the pulses from pickup 75, which are generated by the rotating 8 lines per inch pulse disc 69, to reach the control circuitry. Therefore, with the format tape in the right-hand position, the printer stops to receive a line of printing under the control of pulse disc 69 and the pickup head 75.

This invention has been described in the environment of a high-speed printing machine. It is obvious, however, that changing the density or spacing of operations may be accomplished according to the principles of our invention in any format tape controlled machine. Our invention, therefore, should only be limited by the scope of the appended claims.

I claim:

1. In a machine for advancing material through a work area for performing operations on said material according to format information contained on an endless control tape, apparatus for selecting the spacing of said operations comprising:

two coaxially aligned drive sprockets of different diameters driven in synchronism with said material advance for selectively advancing said control tape; and slidable means for sensing the information on said tape when said tape is advanced by either of said drive sprockets.

2. The apparatus of claim 1 further comprising two rollers, each roller being complementary to one of said drive sprockets for defining an individual one of two tape positions, each of said positions corresponding to a different spacing of operations.

3. The apparatus of claim 2 further comprising means for adjusting the longitudinal distance between said drive sprockets and said rollers.

4. The apparatus of claim 3 wherein said adjusting means includes:

a guide attached to said machine;

a slidable block frictionally coupled to said guide, said rollers being attached to said block; and a lever for releasing said frictional coupling.

5. The apparatus of claim 4 wherein said two rollers are coaxially aligned.